United States Patent
Patten

(10) Patent No.: US 11,028,836 B2
(45) Date of Patent: Jun. 8, 2021

(54) DRIVE SYSTEM COMPRISING AT LEAST ONE METAL ELEMENT EXHIBITING SHAPE MEMORY PROPERTIES

(71) Applicant: Bleco-Apparatebau GmbH, Greven (DE)

(72) Inventor: Werner Patten, Greven (DE)

(73) Assignee: BLECO-APPARATEBAU GMBH, Greven (DE)

( * ) Notice: Subject to any disclaimer, the term of this patent is extended or adjusted under 35 U.S.C. 154(b) by 0 days.

(21) Appl. No.: 16/652,475

(22) PCT Filed: Oct. 1, 2018

(86) PCT No.: PCT/EP2018/076662
§ 371 (c)(1),
(2) Date: Mar. 31, 2020

(87) PCT Pub. No.: WO2019/068648
PCT Pub. Date: Apr. 11, 2019

(65) Prior Publication Data
US 2020/0271107 A1 Aug. 27, 2020

(30) Foreign Application Priority Data

Oct. 5, 2017 (DE) .......................... 102017123146.3
Apr. 27, 2018 (DE) .......................... 202018102372.1

(51) Int. Cl.
*F03G 7/06* (2006.01)
*F03G 7/04* (2006.01)

(52) U.S. Cl.
CPC .............. *F03G 7/065* (2013.01); *F03G 7/04* (2013.01)

(58) Field of Classification Search
CPC .............. F03G 7/065; F03G 7/04; F03G 7/06
(Continued)

(56) References Cited

U.S. PATENT DOCUMENTS 3,339,077 A * 8/1967 Shapiro ................ H02N 11/002
290/1 R
4,031,704 A * 6/1977 Moore .................... F04B 17/00
60/325
(Continued)

FOREIGN PATENT DOCUMENTS

DE 102010032777 A1 2/2012
GB 2533357 A 6/2016

OTHER PUBLICATIONS

WIPO, International Search Report (in parent application), dated Jan. 11, 2019.

*Primary Examiner* — Hoang M Nguyen
(74) *Attorney, Agent, or Firm* — Laurence P. Colton; Smith Tempel Blaha LLC

(57) ABSTRACT

A drive system based on cyclic conversion of thermal energy into mechanical or electrical energy by using a difference in temperature between at least two media and the contraction of a metal element with shape memory properties, and a method for generating energy using the drive system. The drive system has a first and a second store containing media at different temperatures, the second store having a passage opening through a bottom of a housing. The housing is a cylinder containing a liquid-tight and gas-tight cylinder piston dividing the cylinder into two cylinder spaces of variable volumes. One cylinder space contains the metal element and the other cylinder space contains a restoring element. The metal element is secured to the piston at a fixing point and to a fixing point within the second store so that the metal element is in contact with the medium of the second store.

18 Claims, 9 Drawing Sheets

(58) Field of Classification Search
USPC .................................. 60/527–529; 91/462
See application file for complete search history.

(56) References Cited

U.S. PATENT DOCUMENTS

| | | | | |
|---|---|---|---|---|
| 4,075,846 A | * | 2/1978 | Li | F03G 7/065 |
| | | | | 60/527 |
| 4,325,217 A | | 4/1982 | Golestaneh | |
| 4,341,072 A | * | 7/1982 | Clyne | F03G 7/06 |
| | | | | 60/325 |
| 4,955,196 A | | 9/1990 | Lin | |
| 6,052,992 A | * | 4/2000 | Eroshenko | F28D 20/00 |
| | | | | 60/509 |
| 6,192,683 B1 | * | 2/2001 | Stock | F02G 5/02 |
| | | | | 60/527 |
| 2010/0066051 A1 | * | 3/2010 | Haugen | F03G 1/00 |
| | | | | 280/124.157 |

* cited by examiner

DRIVE SYSTEM COMPRISING AT LEAST ONE METAL ELEMENT EXHIBITING SHAPE MEMORY PROPERTIES

CROSS REFERENCE TO RELATED APPLICATIONS

This patent application is the US National Phase of and claims priority on and the benefit of International Application No. PCT/EP2018/076662 having an international filing date of 1 Oct. 2018, which claims priority on and the benefit of German Patent Application No. 102017123146.3 having a filing date of 5 Oct. 2017 and German Patent Application No. 202018102372.1 having a filing date of 27 Apr. 2018.

BACKGROUND OF THE INVENTION

Technical Field

The invention relates to a drive system based on the cyclic conversion of thermal energy into mechanical or electrical energy by using a difference in temperature between two media (M1, M2) and the contraction of a metal element with shape memory properties.

Furthermore, the invention relates to a process for generating energy by converting heat into mechanical or electrical energy in a closed drive system.

Prior Art

The metal element is composed of an alloy with shape memory. Shape memory alloys are special metals that can exist in two different crystal structures. They are also known as memory metals. This is due to the phenomenon that they can apparently remember an earlier shape despite subsequent strong deformation and, under predefined external conditions, are able to regain their original contour after a deformation.

Shape memory alloys can also "remember" two shapes—one at high and one at low temperature—through a so-called two-way effect. At high temperature the metal element has an austenitic microstructure and at low temperature a martensitic microstructure. Cooling an austenitic shape or microstructure to a temperature within the martensitic range thus causes deformation.

In order for the constructive element to regain its defined shape upon cooling, it must first be "trained" by thermomechanical treatment cycles. This causes the formation of stress fields in the material which promote the formation of certain martensitic variants that develop during cooling.

Metal elements made of shape memory alloys of different shapes, such as wire and strip sections, strands and spirals, have been known for a long time and are used in many devices and equipment, particularly in the medical field. Attempts are also being made to build drive units for industrial purposes in which energy is recovered from waste heat through the cyclical contraction of the metal element.

The metal elements can, for example, consist of copper-zinc, copper-zinc-aluminum, copper-aluminum-nickel, iron-nickel-aluminum alloys. However the main alloy is a nickel-titanium alloy called nitinol. Nitinol exhibits a significant transformation property to return to its original shape when heated or cooled once it is deformed. The transformation processes of nitinol are reversible, whereby the total entropy—at least theoretically—does not increase but remains constant. However, nitinol loses its cyclically recurring properties if it is heated above a maximum threshold temperature. Excessive temperature or deformation of the nitinol element can lead to deregulation and damage to the drive system.

A drive system described in the preamble is known from DE 10 2010 032 777 A1. The known drive system discloses essentially an arrangement of shape-memory metal elements in a housing and various special-purpose power transmission devices, such as permanent magnets and coils. The shape memory element is attached at one end to the housing and at its other end to a connecting element protruding into the interior of the housing, which has a lever-like effect on the shape memory element. The connecting element divides the interior of the housing into two chambers, which are in contact with each other, so that the gaseous or liquid medium must flow through these two chambers simultaneously. A valve is installed inside the housing, directly in the connecting element.

The known drive system fails to disclose technical means with which the important parameters, such as specified temperatures, can be maintained. On the whole, the device is complicated and expensive, since it requires a special movement mechanism of the shape memory element.

Known from DE 10 2014 006 505 A1 is an apparatus for generating mechanical or electrical energy by using a small temperature difference in relation to the prior art. The apparatus comprises a solid connection of thermal actuator and liquid pump. This unit is alternately immersed in a warmer heat transfer medium and a colder heat transfer medium. In the process, a large number of lens-shaped pre-stressed thermobimetals deform in the thermal actuator and drive a liquid pump via a piston rod. The resulting pressure energy increases the pressure energy in a pressure reservoir to enable the smooth and continuous operation of a generator. The respective heat energies are stored in suitable heat stores and taken from the atmosphere, water or the ground using conventional heat exchangers.

BRIEF SUMMARY OF THE INVENTION

The invention relates to a drive system based on the cyclic conversion of thermal energy into mechanical or electrical energy by using a difference in temperature between two media (M1, M2) and the contraction of a metal element with shape memory properties.

Furthermore, the invention relates to a process for generating energy by converting heat into mechanical or electrical energy in a closed drive system.

The drive system comprises:
 at least one drive assembly which comprises a housing with at least one metal element placed inside the housing,
 at least one restoring element located inside the housing,
 at least one actuating element to which the metal element and the restoring element are coupled,
wherein a gaseous or liquid medium flows around the metal element and the restoring element. The contraction of the metal element is preferably in a uniaxial direction and is reversible. Further, the invention relates to a method for generating energy by means of such a drive system.

The object of the invention is to design an alternative yet simplified drive system of the type mentioned above in which the temperature differences between warming and cooling can be kept constant by simple means.

This object is achieved by a drive system based on the contraction of a metal element and having the features of being based on the cyclic conversion of thermal energy into mechanical or electrical energy by using a difference in temperature between at least two media and the contraction of a metal element with shape memory properties, comprising:
  at least one drive assembly which comprises a housing with at least one metal element placed inside the housing,
  at least one restoring element located inside the housing,
  at least one moveable actuating element to which the metal element and the restoring element are coupled,
  wherein a gaseous or liquid medium flows around the metal element and the restoring element,
characterized in that
  the drive assembly comprises at least one first and at least one second store containing media at different temperatures, wherein the second store has a passage opening for direct connection through a bottom of the housing,
  the housing is a cylinder which contains a cylinder piston,
  the cylinder piston divides the cylinder into two cylinder spaces of which the one, first cylinder space bounded by the bottom contains the metal element with shape memory properties and the other, second cylinder space contains the restoring element,
  wherein the metal element is secured to the cylinder piston at a fixing point on the cylinder piston and to a fixing point located within the second store so that a section of the metal element is in contact with the medium of the second store and a section is in contact with the medium in the second store.

The metal element contracts preferably in a uniaxial direction. The drive system according to the invention comprises:
  at least one drive assembly having at least one first and at least one second store containing media at different temperatures, wherein a passage opening is provided in the second store for direct connection through a bottom of the housing,
  the housing in the shape of a cylinder, which contains a cylinder piston arranged in a liquid-tight and gas-tight manner,
  wherein the cylinder piston divides the cylinder into two cylinder spaces of which the one, first cylinder space contains the metal element with shape memory properties and the other, second cylinder space contains the restoring element,
  and wherein the metal element is secured to the cylinder piston at a fixing point and to a fixing point located within the second store so that a section of the metal element is in contact with the medium of the second store.

The media located in the first and/or second store have different temperatures and can be either liquid or gaseous. The medium of the second store preferably has a temperature that is lower than the temperature of the medium of the first store.

It is expressly pointed out that more than two stores and/or more than two drive units can be used in the drive system, whose cylinder pistons arranged in separate housings (cylinders) can, for example, be interconnected cyclically with corresponding phase shifts in succession.

The drive assemblies can be coupled together fluidically, electrically, electromagnetically, but preferably mechanically.

The drive system comprises a first store that is connected via a first pipe to the second cylinder space containing the restoring element. At least one first valve is installed in the pipe. The first store is connected via a second pipe to the first cylinder space containing the metal element, wherein at least one second valve is installed in the pipe. A check valve is preferably provided as a second valve.

It is advantageous that the drive system is equipped with valves which are installed outside the housing, here: outside the cylinder, in a familiar way in pipes. There is no need to install the valves in the housing.

The metal element is preferably realized in a wire, strip, sheet, strand or spiral shape. It is preferably in the form of a section of nitinol wire, in particular preferably in the form of a nitinol spring.

The metal element is preferably selected from alloys of the groups:
copper-zinc (CuZn),
copper-zinc-aluminum (CuZnAl),
copper-nickel-nickel (CuAlNi),
iron-nickel-aluminum (FeNiAl), and
nickel-titanium (NiTi).

The spring element arranged in the second cylinder chamber functions as a return or restoring element. The spring element can be a metal helical tensioning spring or, for example, a bellows-type elastomer, which can be loaded cyclically over a longer period of time. However, the restoring element can also be formed from a traction device such as a rope, wire or rod coaxially connected to the cylinder piston. The piston rod can also be in the form of a slotted hollow shaft through which the wire passes. The cylinder can be a single or double acting cylinder or a telescopic cylinder.

A great advantage is that the metal element with shape memory is reversibly deformable within a pre-defined temperature range. Shape memory alloys can transfer very large forces up to several 100,000, motion cycles without noticeable fatigue. Compared to other actuator materials, shape memory alloys have by far the greatest specific working capacity (ratio of work done to material volume).

A further advantage is that the internal energy of the medium, in particular waste heat, can be converted into usable mechanical work by means of a simple device, namely the drive system according to the invention.

A method for generating energy by converting heat into mechanical or electrical energy in a closed drive system by means of at least one metal element placed in at least one cylinder and which has shape memory property and is subjected to uniaxial contraction, wherein a temperature difference is maintained by a cyclical pumping process, which is realized by a reciprocating cylinder piston to which the metal element is attached, can be implemented by controlling a pumping operation by actuating a valve control by the stroke of a piston rod provided on the cylinder piston.

The method can also relate to a functional connection of at least two drive assemblies with one another, in that traction means are coaxially connected to the piston rods, which exert a translatory movement along the cylinder axis up to the deflection rollers.

The heat involved can be any heat source or heat sink or waste heat generated by technical equipment and installations, for example from a combustion engine, boiler, geothermal, solar thermal or exothermic chemical plant. The drive system according to the invention can be used to implement various drive concepts, such as a connection between the cylinder piston and the crankshaft where a linear stroke of the cylinder piston sets the crankshaft in a circular motion. It is possible to use a plurality of drive assemblies which can be connected in parallel or in series and have shape memory elements.

BRIEF DESCRIPTION OF THE DRAWINGS

The invention will be discussed in more detail with reference to the drawings.

The figures show.

Figure 1:
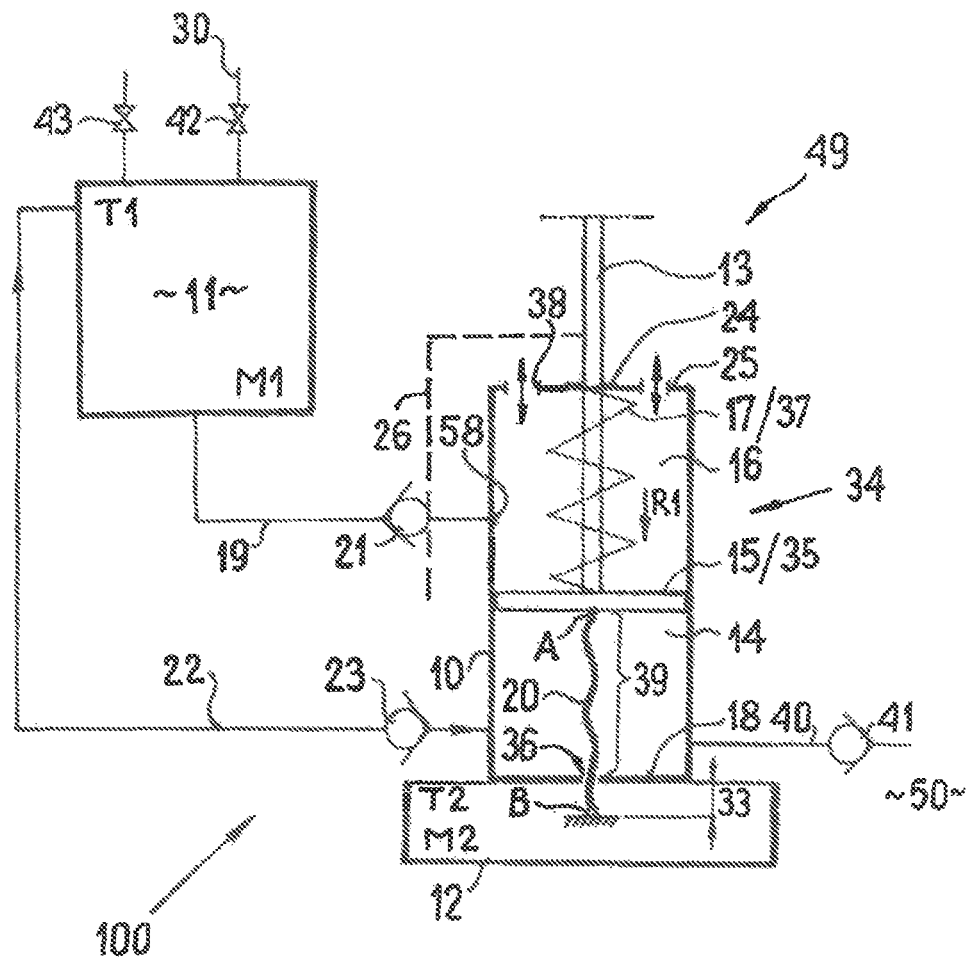
FIG. 1 is a block diagram of the drive system with two stores.

In the following figures, identical or similar elements can be provided with the same or similar reference numbers. Furthermore, the figures of the drawing, their description and the claims contain numerous features in combination. It is clear to a person skilled in the art that these features can also be considered individually or arranged in further combinations not described here in any further detail.

DETAILED DESCRIPTION OF PREFERRED EMBODIMENTS

In the following, the term "metal element" is replaced by "nitinol spring". It is assumed that the ratio of nickel to titanium in the nickel-titanium alloy corresponds to a predetermined deformation temperature of the nitinol, otherwise material fatigue or permanent deformation of the nitinol wire can occur, ultimately resulting in the collapse of the drive system according to the invention.

Embodiments having uniaxial shape memory elements, i.e. wire-like nitinol springs, are shown below.

A drive system 100 shown schematically in FIG. 1 is formed by a drive assembly 49 comprising the following elements:
- a housing 34 in the form of a cylinder 10 with a cylinder bottom 18 and a cylinder cover 25, wherein at least one continuous aperture 38 is provided in the cylinder cover 25,
- a cylinder piston 15 (actuating element 35) movable within the cylinder 10 with a piston rod 13,
- a first store 11 (heat accumulator) with medium M1 and a second store 12 containing a medium M2 whose temperature T2 is lower than the temperature T1 of medium M1 in the first store 11,
- two cylinder spaces 14, 16 of a variable volume and separated from one another by the cylinder piston 15, wherein the first cylinder space 14 contains a nitinol spring 20, which extends between two fixing points A on the cylinder piston 15 and B within the second store 12,
- a restoring element 37, here: spring element 17 in the form of a helical tensioning spring surrounding the piston rod 13 and which is located in the second cylinder space 16 and is attached to the cylinder piston 15 and the cylinder cover 25,
- wherein the first store 11 is connected via a first pipe 19 to the second cylinder space 16 and via a second pipe 22 to the first cylinder space 14 which contains the nitinol spring 20.

The nitinol spring 20 extends into the interior of the second store 12 via a passage opening 36 in the cylinder bottom 18. It is in contact with a first medium M1 in a section 33 extending from fixing point B to the surface of the second store 12, and in contact with the second medium M2 in a section 39 extending from fixing point A to the surface of the second store 12, or to the cylinder bottom 18. In the shown exemplary embodiment, the first medium M1 is water having a temperature T1 of 4° C. and the second medium M2 is a gas, for example air, having a temperature T2 of 20° C.

Essential for the invention is that temperature T1 is high enough to active the nitinol spring 20. The temperature difference is required to stop the activation of the nitinol spring 20 and to achieve its restoration. The first medium M1 can circulate in a circulation system with the regions cylinder space 14, line 22, store 11 and line 19.

The circulation system can be a closed system in which the quantity of the medium circulating in the circulation system is constant (not shown).

Alternatively, the circulation system may include a supply and discharge device for the first medium M1. In the example shown in FIG. 1, the inflow is realized via a line 40 with a valve 41, for example a check valve. The outflow device can take the form of a line 30 with a valve 42 coupled to the store 11. The circulation system can thus also form a compressor which compresses the first medium M1 in store 11 and makes it available to a downstream consumer.

The medium provided through the inflow line 40 to the circulation system according to FIG. 1 originates either from a reservoir (not shown) or from the outside area 50. If the outside area 50 is the atmosphere, for example, the medium is the ambient air. It may be provided that ambient air is also provided as the first medium M1. In this case, the temperature T1 essentially corresponds to the ambient air temperature.

The temperature of the second medium M2 in the second store 12 is essentially constant. Since a supply of ambient air from the outside area 50 to the cylinder space 14 is provided via line 40, whereby in the example according to FIG. 1 the outside air is also the first medium M1, the temperature T1 adjusts to the ambient temperature as the process progresses. Such a system can be considered, for example, if the waste heat of an engine forms a virtually unlimited reservoir in the outdoor area 50.

The cylinder piston 15 moves back and forth in cylinder 10, oscillating toward cylinder bottom 18 (direction R1) and cylinder cover (direction R2). In order to avoid pressure differences in cylinder space 16, the apertures 38 already mentioned are provided in the cylinder cover 25.

The temperature and expansion levels are configured so that said nitinol spring 20 passes cyclically between austenite and martensite phases during mechanical stress and relaxation.

Installed in the first pipe 19 leading to an aperture 58 on the cylinder 10 is a valve 21 which in the shown exemplary embodiment is controlled by the stroke of the piston rod 13. Provided on the second pipe 22 is a further valve 23 which functions as a check valve.

Figure 3:
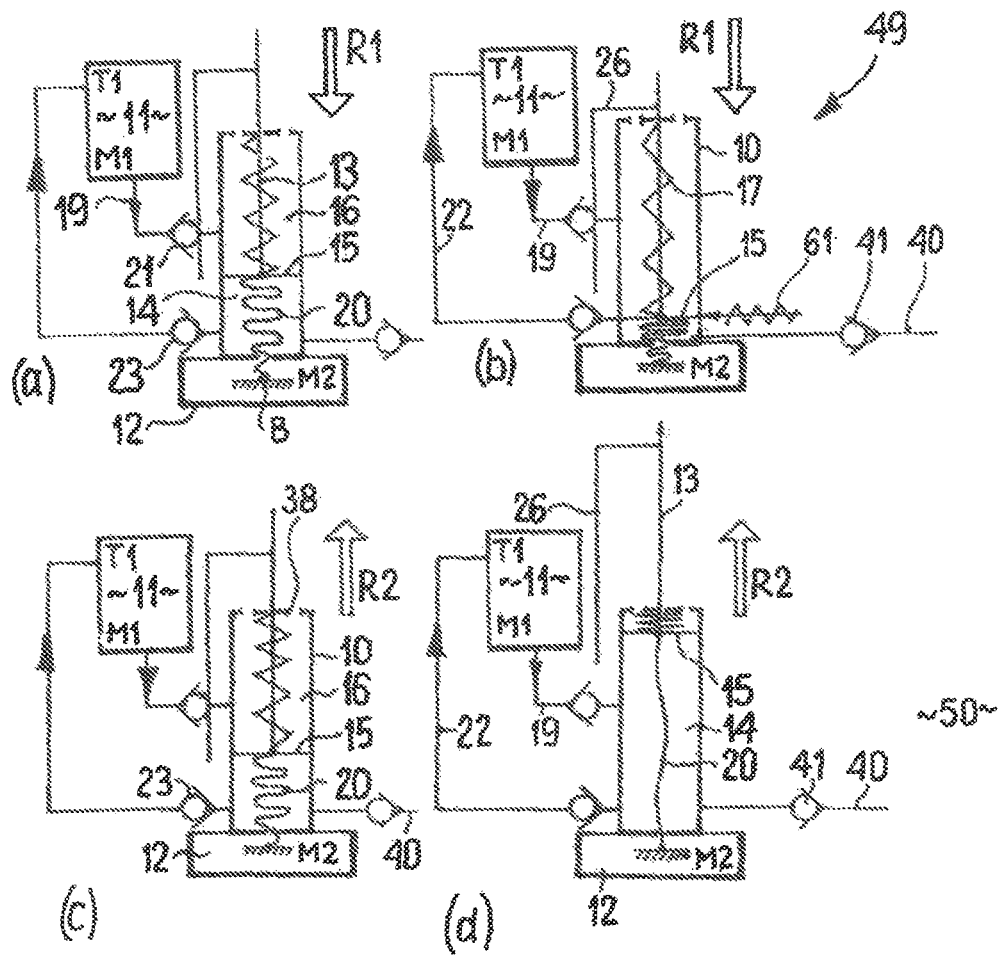
FIG. 3 is a diagram of a cycle of the drive system pursuant to FIG. 1.

Provided on the cylinder cover 25 is a sealing element 24 for the piston rod 13 that can be in the form of a profiled rubber ring. As shown in FIG. 3, a circumferential piston seal 27 (O-ring) can be provided on the cylinder piston 15.

Furthermore FIG. 1 shows a valve controller 26 indicated by a dashed line, which acts mechanically, electrically or electronically on the valve 21. With the stroke of the piston rod 13 a proportional control of the valve is implemented. Preferably the control is carried out without any external energy input, for example by means of energy generated during the process.

The aim is to achieve the most adiabatic change in state possible, i.e. a thermodynamic process in which the system, in this case the drive system 100, is transferred from one state to another without exchanging heat with its environment. In practice, however, the conditions for adiabatic changes in state are never fully achieved.

Figure 5:
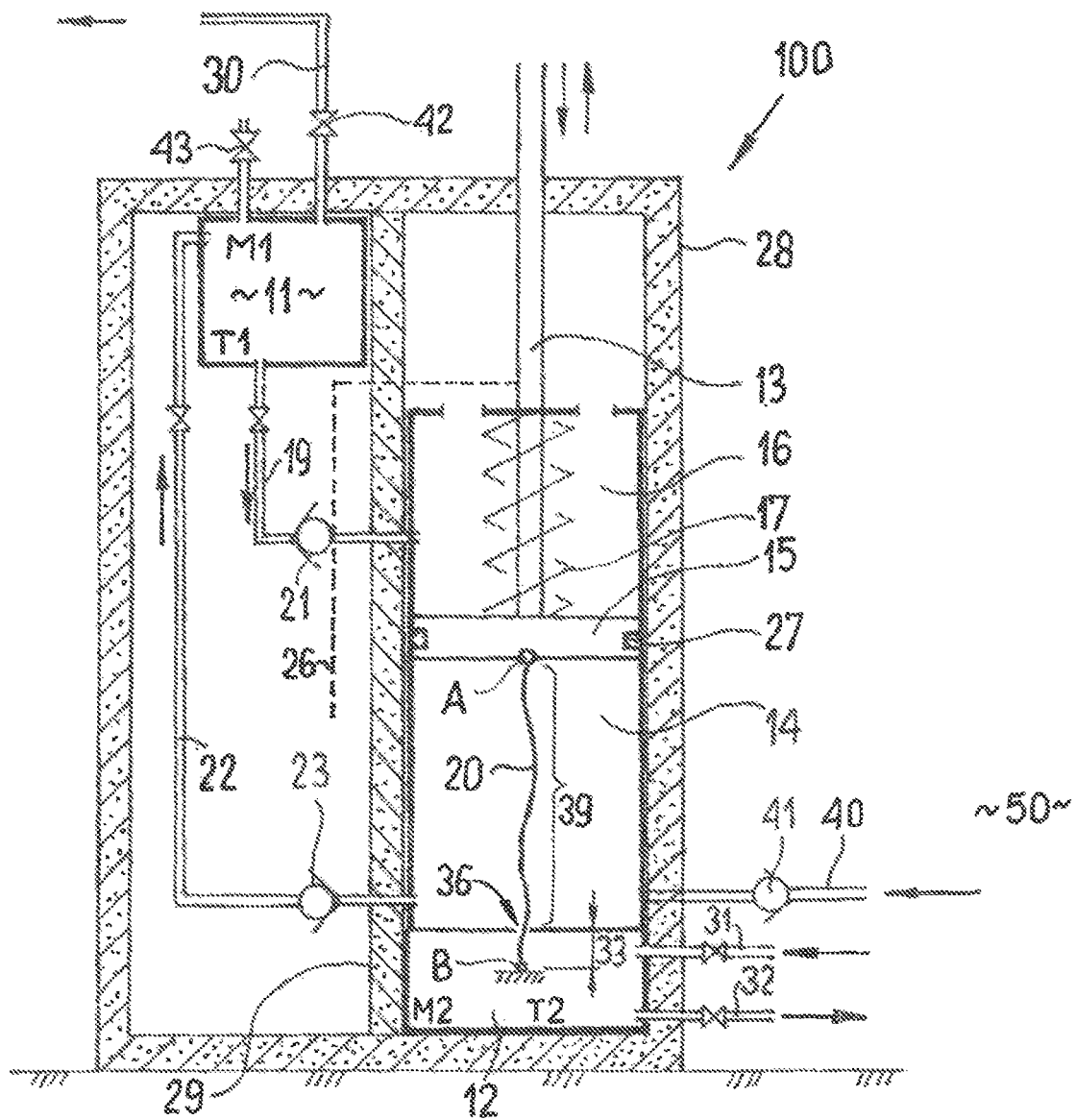
FIG. 5 is a schematic view of the drive system of FIG. 1, thermally insulated.

In order to make the drive system 100 heat-tight, it can be housed in a thermo-insulating housing 28 (cf. FIG. 5). A likewise thermally insulating inner wall 29 separates the first store 11 with the warm medium M1 from the second store 12 filled with the colder medium M2, including the piston cylinder. The waste heat can be provided by an engine or other combustion engine (not shown) or an industrial chemical converter (reactor), furnace, sewage treatment plant, bioenergy plant, geothermal energy, etc.

In the exemplary embodiment shown, the second store 12 located in the housing 28 is filled with medium M2, for example water, having a temperature T2. In order to keep the medium M2, here water, contained in store 12 at a constant temperature, it is possible to provide a cooling unit (not shown) or a supply line 31 connected to a reservoir (also not shown) (cf. FIG. 5). If a lake or a sea is used as a reservoir, the water is kept at an at least largely constant temperature T2 by environmental influences. The water enters the store 12 via the supply line 31 (cf. FIG. 5). Provided at the bottom of the store 12 is an outlet 32. In addition, the store 12 is preferably made of corrosion-resistant material such as stainless steel or rigid thermoplastic.

The temperature of the two stores 11, 12 is monitored with the aid of preferably wireless temperature sensors (not shown).

In a method for generating energy by converting heat into mechanical or electrical energy in drive system with the help of a metal element placed in a cylinder and which has a shape memory property and is subject to uniaxial contraction, the temperature T1 must attain a value at which the nitinol spring 20 is activated.

The activation of the nitinol spring 20 is terminated by a temperature difference so that the nitinol spring can assume its original position with the aid of the restoring spring 17. A cyclical pumping process is achieved by the reciprocating cylinder piston 15, to which the metal element 20 is attached. The pumping process is controlled by a fluid medium in that a valve controller 26 is actuated by the stroke of the piston rod 13.

Figure 2:
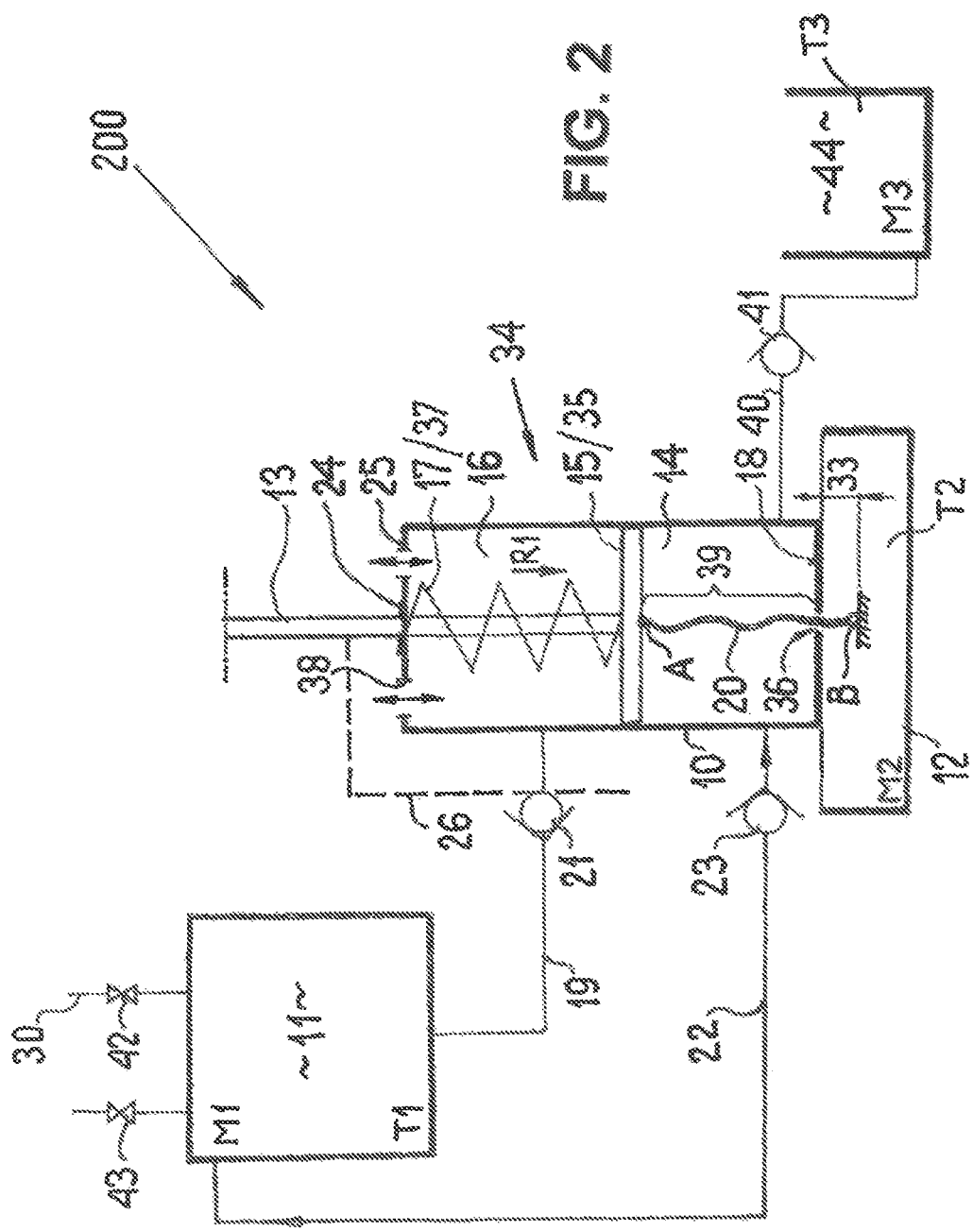
FIG. 2 is a block diagram of the drive system with three stores.

However, too great of a temperature difference between the media M1, M2 can reduce performance since the heating-up phase may take longer. For this reason, an addition, third store 44 (cf. FIGS. 2 and 4) for a third medium M3 can be provided which is a component of a drive system 200 shown in FIG. 2. Otherwise, the drive system 200 includes all elements of the drive system 100. The third store 44 is connected via a line 40 to the cylinder space 14. Provided on the line 40 is valve 41, here: a check valve.

Figure 6A:
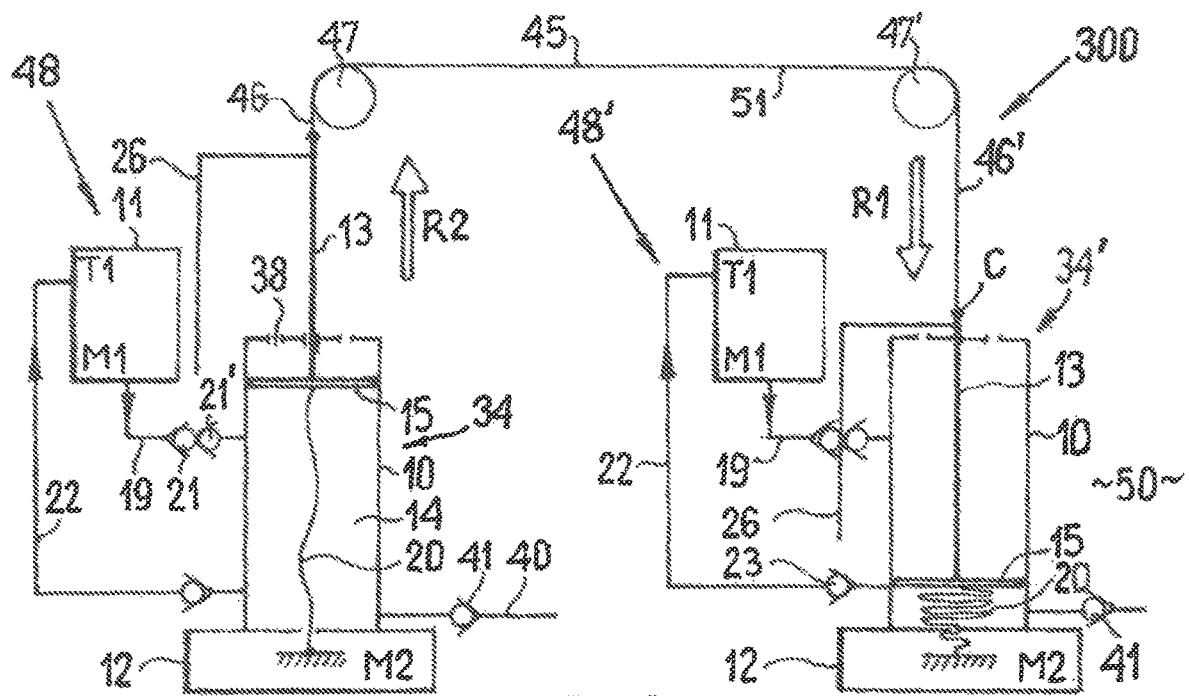
FIGS. 6a, 6b and 7a, 7b is a schematic view of a respective cycle of a drive system consisting of two drive assemblies coupled to each another.
Figure 6B:
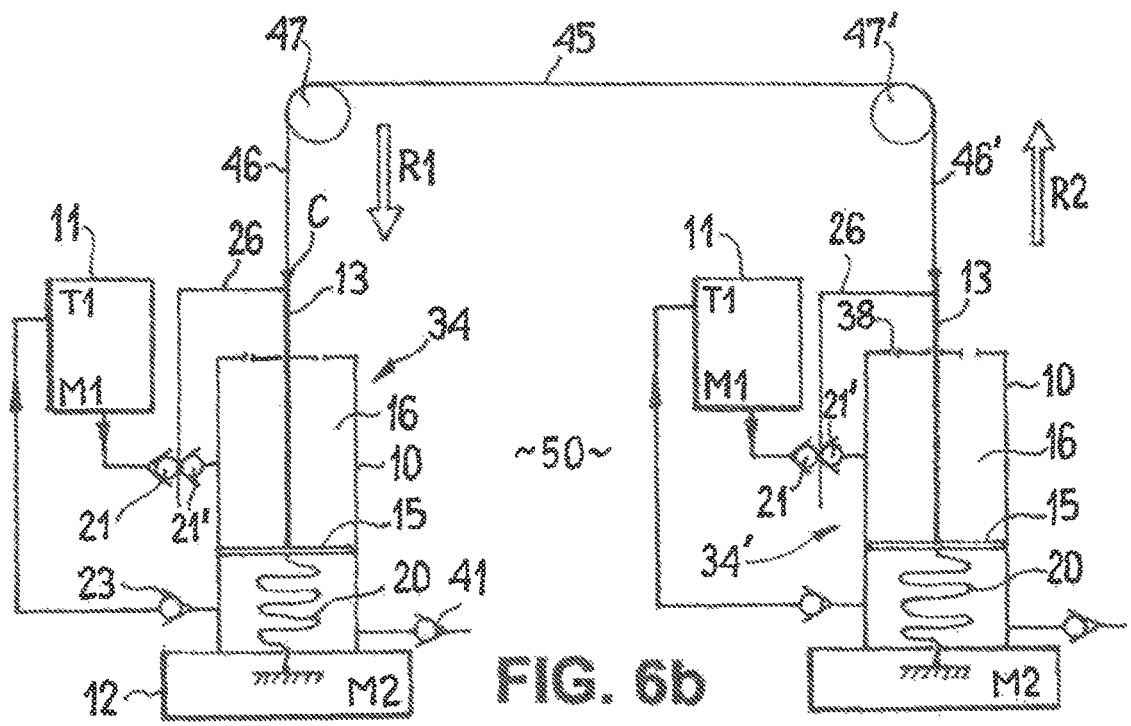
Figure 7A:
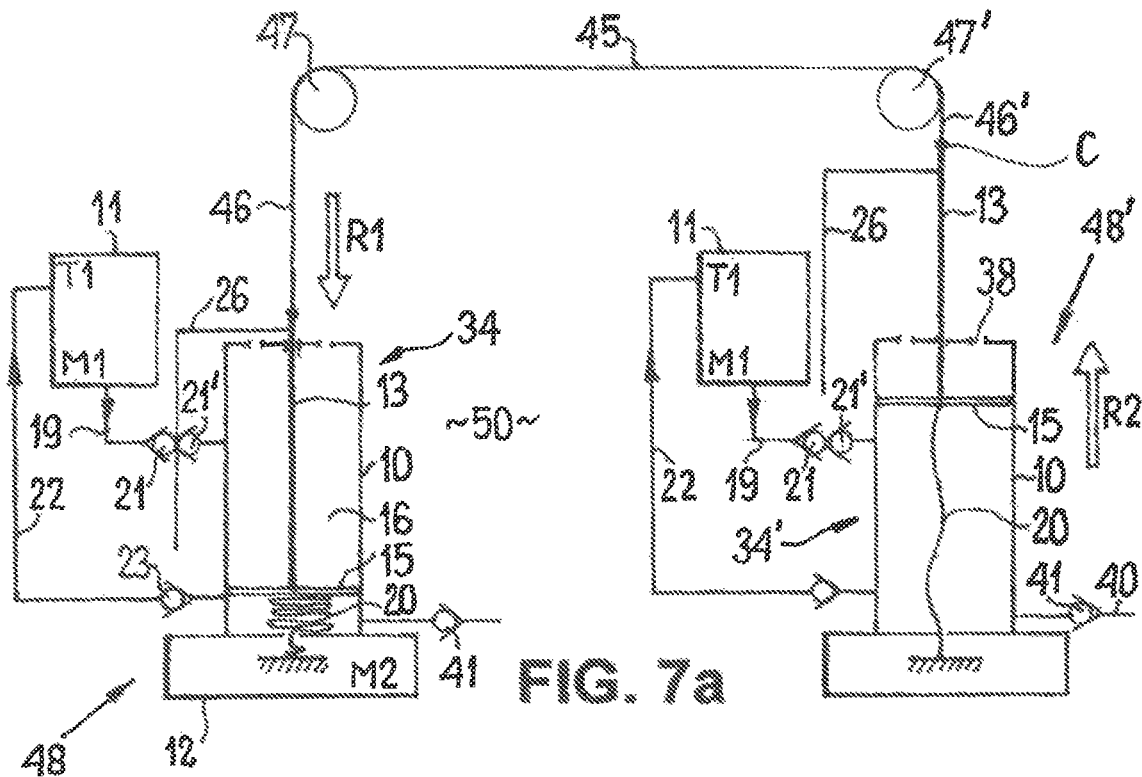
Figure 7B:
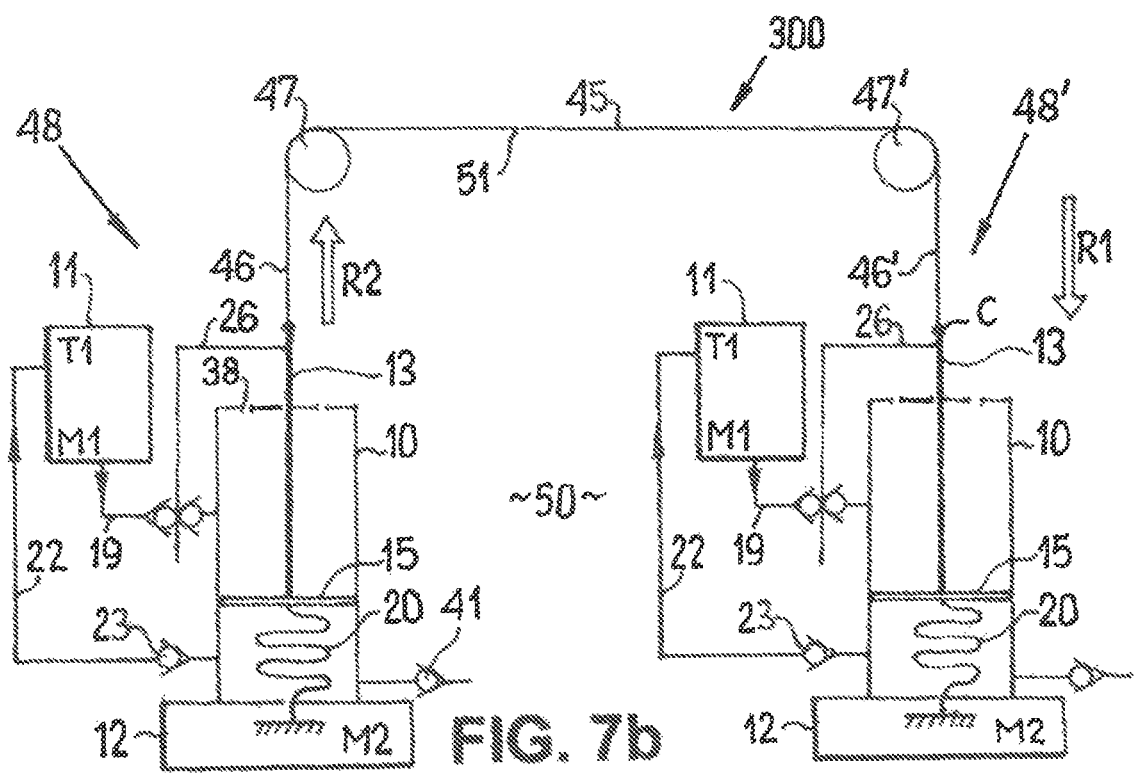

A drive system 300 shown in FIGS. 6a and 6b as well as in FIGS. 7a and 7b comprises two drive assemblies 48, 48' coupled to each other via a cable 45. The drive assemblies 48, 48' are each similar to the drive assembly 49 shown in FIG. 1, with the difference that instead of the spring element 17 a variable cable section 46, 46' coaxially connected to the piston rod 3 is provided. The cable sections 46, 46' are each guided in a straight line from a connection point C at the free end of the piston rod 13 to a deflection roller 47, 47'. The cable 45 is formed by the two cable sections 46, 46' and a constant central section 51 that extends between the deflection rollers 47, 47' such that the overall length of the cable 45 is always the same. The piston rod 13 including cable section 46, 46' corresponds functionally to the restoring element.

The two stores 11 can be connected to one another or replaced by a common store (not shown). This also applies to both stores 12 containing the medium M2.

Mode of operation (cf. FIG. 3):

FIG. 3 shows the phases of a cycle in which the nitinol spring 20 is activated by a warm medium M1. Phase (a) illustrates the movement of the cylinder piston 15 with piston rod 13 in direction R1, i.e. toward the store 12. There the nitinol spring 20 attached at fixing point B makes contact with the cold medium M2, which causes cylinder piston 15 to be moved to its end position, cf. phase (b). In the process, the activated nitinol spring 20 presses the activating medium M1 through the second pipe 22 into the store 11. At the same time, the nitinol spring 20 is pressed into the medium M2 located in store 12.

At the start of the piston movement in direction R1, the line 19 is closed via a valve controller 26. The medium M1 located in the store 11 can therefore no longer escape. The medium located in the outside area 50 reaches the cylinder space 16 through the apertures 38. At the same time, the cylinder piston presses the medium M1 in the cylinder space 14 through the line 19 into the store 11 and stretches the spring element 17. It is essential that the spring element 17 has a spring characteristic curve that allows it to be stretched by the nitinol spring 20. The tensile force of the contracting nitinol spring 20 must therefore be greater than the restoring force of the spring element 17.

The cylinder piston 15 moving in direction R1 exerts a compressive force on the medium M1 in cylinder space 14.

Since line 40 is closed by a check valve 41, the medium M1 can only escape via line 22. The valve 23 in line 22 allows flow in the direction of store 11 and shuts off the line in the opposite flow direction. The medium M1 passes through the line 22 and reaches the store 11, whose pipe 19 is closed by the valve controller 26 in this operational phase. The gaseous medium M1 is thus compressed in store 11.

The cylinder piston 15 with spiral tensioning spring 17 not only has the function of moving within the cylinder 10. An important task of the cylinder piston 15 is to pump the medium within the drive system 100, thus enabling the entire thermodynamic process to be controlled.

The end of phase (a) and the beginning of phase (b) is reached when cylinder piston 15 has attained its lower end position. Spring element 17 (spiral tensioning spring) is then stretched to its maximum and now pulls cylinder piston 15 upwards again, i.e. in the direction R2 or the cylinder cover 25. The nitinol spring 20 is stretched by the spiral tensioning spring 17, as phase (c) shows, until the cylinder piston 15 reaches its maximum upper position below the cylinder cover 25, as phase (d) shows.

The force required to stretch out the nitinol spring 20 is less than the tensile force of the spiral tensioning spring 17. The force that must be applied for deformation at low temperatures is much smaller than the force that is released when the original, for example straight, shape of the nitinol spring 20 is reached.

In the end position of the cylinder piston 15 in phase (b), the nitinol spring 20 can be fully immersed in store 12 if the nitinol spring 20 is attached to a spacer element (not shown), which is placed on the underside of cylinder piston 15. As shown in FIG. 3, phase b), a preferably spring-loaded locking pin 61 is provided on cylinder 10, with which cylinder piston 15 is held in its lowest position and released. The locking pin is preferably controlled by digital means. Such a locking pin can also be provided in the upper end position. The function of this locking pin in the upper end position corresponds to that of the locking pin in the lower end position, with the difference that the upper locking pin is intended to ensure complete heating of the nitinol spring, while the lower locking pin is intended to ensure complete cooling.

Alternatively, it is also possible to use other control systems, such as time-controlled clocking or a control system based on contact or proximity sensors.

Figure 8:
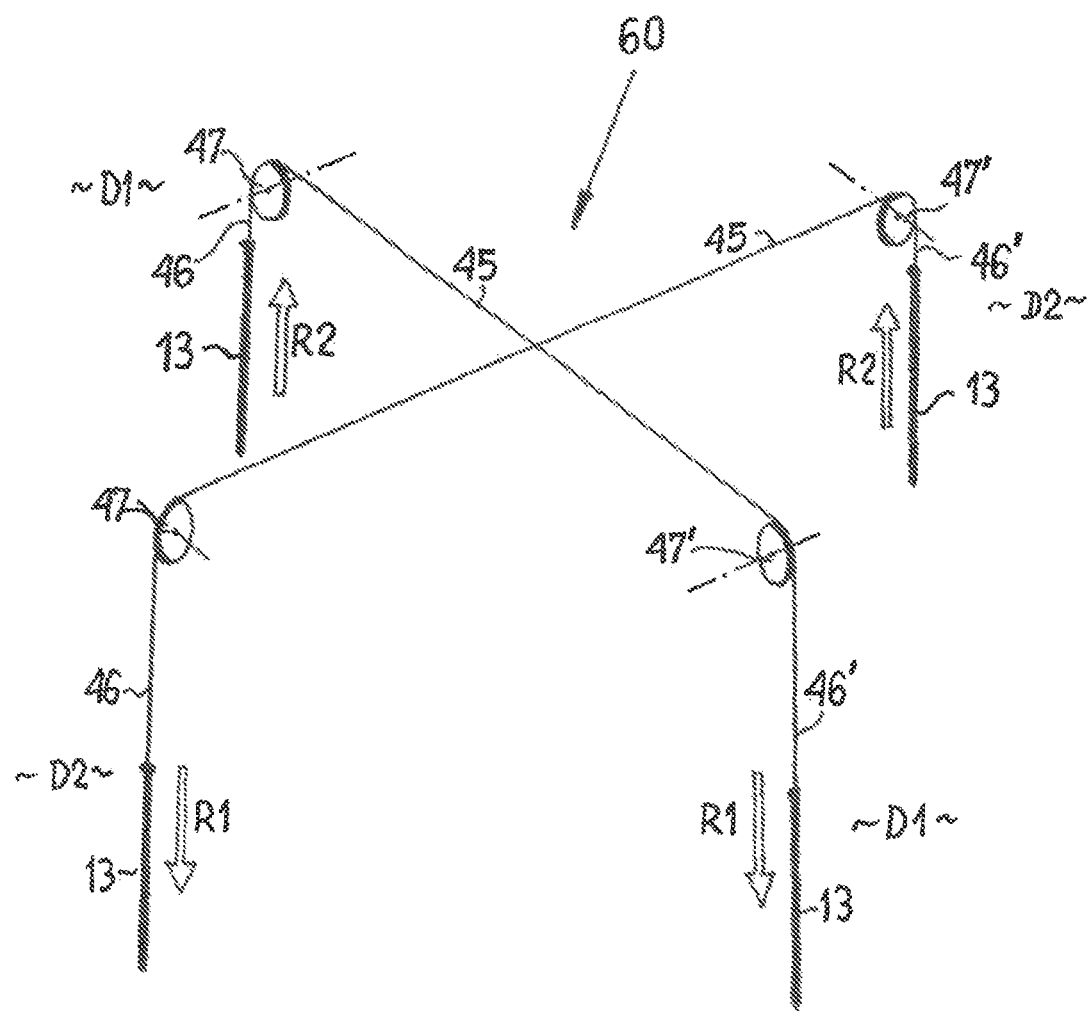
FIG. 8 is a simplified representation of an arrangement of restoring elements comprising cylinder pistons and cable sections of a drive system composed of four drive assemblies.

The use of the controllable locking pin 61 improves the synchronization of the processes that take place temporally arranged in a predetermined sequence, therefore the use of controllable locking pins is particularly advantageous on a drive unit 60 comprising a plurality of drive assemblies (cf. FIG. 8).

In operational phase (c), the cylinder piston 15, pulled by the spring element 17, moves in the direction R2, drawing the medium located outside 50 through the line 40 into the cylinder space 14. At the same time, the nitinol spring 20 is stretched. As already mentioned, the force necessary to stretch out the nitinol spring 20 is less than the tensile force of the spring element 17. No medium can enter the cylinder space 14 from store 11, because the pipe 22 is closed in this phase by valve 23. The medium in cylinder chamber 16 is forced out through the apertures 38 to the outside area.

The end of phase (c) and the start of phase (d) is reached when the cylinder piston 15 has attained its upper end position. The valve controller 26 gives access from the line 19 to the cylinder 10. Since the cylinder piston 15 is above the access to line 19 at this time, the second medium, depending on the control setting, can enter the cylinder space 14 either from the store 11 via line 19 or from the outside area 50 or from the additional store 44 via line 40 and valve 41.

Mode of operation (cf. FIG. 4):

The operations of this cycle are basically similar to those of the cycle according to FIG. 3.

In phase (a), the nitinol spring 20, activated by the medium M1 contained in the cylinder space 14, contracts at temperature T1. The medium M1 contained in cylinder space 14 is pressed by cylinder piston 15 towards the bottom 18 and returns through line 22 to store 11, while line 40 to the third store 44 with the medium M3 is kept closed by valve 41.

In phase (b), the nitinol spring 20 is fully contracted and is in its end position. When the upward movement of cylinder piston 15 caused by the tensioning spring 17 begins, valve 41 is opened. In cylinder chamber 14, the upward movement of cylinder piston 15 creates a vacuum which allows medium M3 to flow from the third store 44 via line 40 into the cylinder space 14.

In phase (c), the cylinder piston 15 is pulled in the direction of the cylinder cover 25, whereby the medium M3 from the additional store 44 is drawn into the cylinder space 14. This means that no vacuum is created when the cylinder piston 15 is pulled up and the second medium M2 is not sucked upwards through the passage opening 36 for the nitinol spring 20.

In phase (d), cylinder piston 15 is in its upper end position. The first medium M1 passes from the store 11 through the line 22 into the cylinder space 14 below the cylinder piston 15. Medium M3 flows through the line 40, which is now open, and back into the store 44. When the medium M3 is completely drained off, the valve 41 and thus the line 40 is closed, the nitinol spring 20 contracts and pulls the cylinder piston 15 toward the bottom 18, so that the medium M1 is pressed back into the store 11.

With the drive system 200, media which cannot be mixed with each other are used, for example: M1=gas; M2=water; M3=oil. The following inequalities apply to the temperatures of the media: T1>T3>T2 and their weights (specific gravity): W1<W3<W2. The medium M1 (gas) has a temperature T1 and a weight W1. Analogously, temperature T2 and density W2 refer to the second medium (water) and temperature T3 and density W3 to the third medium (oil).

As can be seen from the above inequality, the temperature T3 of the third medium M3 is higher than the temperature of the second medium T2. The vacuum generated in cylinder space 10 during the upward movement of the cylinder piston from the lower to the upper end position causes the third medium M3 to enter cylinder space 14 through line 40. Since the temperature T3 of the medium M3 lies between the temperatures T1 and T2, the activation process of the nitinol spring 20 is accelerated.

The energy for the drive system 100; 200 is provided by the supplied waste heat. The temperature difference between the two media M1, M2 in the stores 11, 12 remains almost constant. The properties of the nitinol spring 20 enable processes to proceed so quickly that there is not enough time for temperature equalization within the system.

The stores 11, 12 and the additional store 44 for the third medium 3 are spatially arranged in such a way that they are favorably positioned according to their underlying energy source and an energetically low-loss circuit, as well as having the possibility of absorbing the respective energy, e.g. by being designed as heat exchangers.

At the piston rod 13 and/or in the store 11, final energy is obtained, which is made available from the introduced waste heat.

Figure 4:
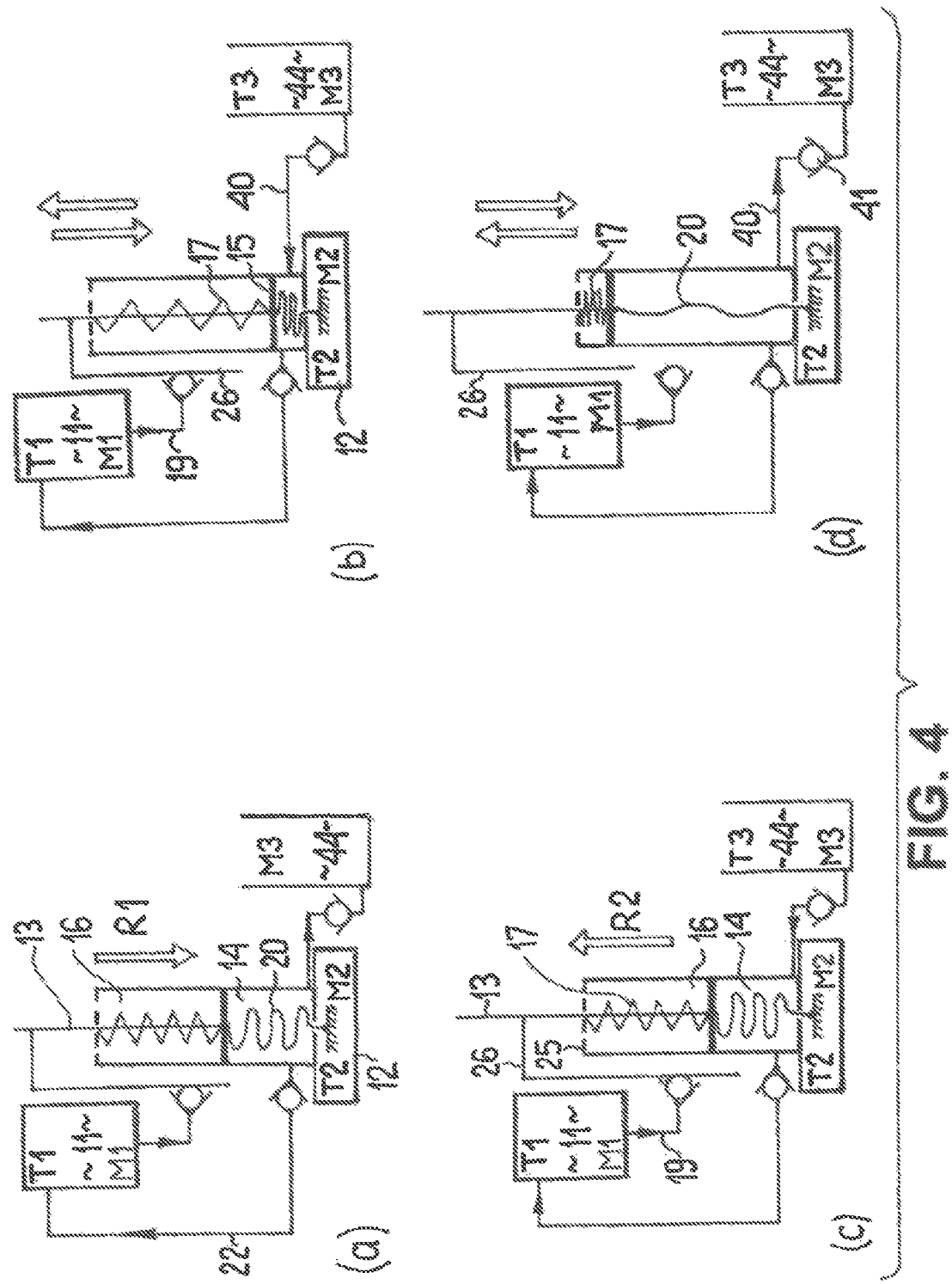
FIG. 4 is a diagram of a cycle of the drive system pursuant to FIG. 2.

Mode of operation when using a plurality of drive assemblies (cf. FIGS. 6a to 8):

Basically all procedures and details already explained in the operational description of FIGS. 3 and 4 apply, except for spring element 17.

FIG. 8 shows a possible configuration of four cylinder pistons 15 in separate cylinders 10 in which four drive assemblies shown in FIGS. 6a and 7a are employed to form a drive unit 60. To achieve coupling, the drive assemblies do not necessarily have to cross each other. They can also be arranged one behind the other.

For better illustration, FIG. 8 shows only two pairs of piston rods 13 with cables 45 and deflection rollers 47, 47', which are also shown in FIGS. 6a and 7a. The central sections 51 of the cables are arranged at right angles to each other. The other parts of the drive assemblies are not shown.

In FIG. 6a, the cylinder piston 15 is in its upper end position (at the left side of the figure). Valve controller 26 provides access from line 19 to cylinder 10. The nitinol spring 20 has reached its maximum length, whereas the cable section 46 has reached its shortest dimension. The upper end position of the cylinder piston 15 corresponds to the lower end position of the second cylinder piston 15 in the interacting drive assembly 48' (right side of FIG. 6a) in which the adjacent valves 21, 21' are closed. The cable section 46' has attained its maximum length. The nitinol spring 20 is almost completely immersed in the store 12. The respective upper and lower end positions of the cylinder pistons 15 and piston rods 13 correspond to a position indicated by "D1" in FIG. 8.

According to FIG. 7a, the cylinder piston 15 is located in its lower end position (left side of the figure) in which the adjacent valves 21, 21' are closed. The cable section 46 has attained its maximum length. The nitinol spring 20 is compressed and almost completely immersed in store 12. The lower end position of the "left" cylinder piston 15 and the piston rod 13 corresponds to the upper end position of the "right" cylinder piston 15 and the piston rod 13 in the interacting drive assembly 48' (right side of FIG. 7a). The cable section 46' has attained its shortest length. The respective upper and lower end positions of the cylinder pistons 15 and piston rods 13 correspond to a position indicated by "D2" in FIG. 8.

FIGS. 6b and 7b each show a momentary working position of the two cylinder pistons 15 after leaving their end positions in both cylinders 10. The two cylinder pistons 15 move, pulled by the cable 45 in direction R1 and R2, respectively, drawing the medium located in the outside area 50 through the respective line 40 into the cylinder space 14. For example, the heated nitinol spring 20 (FIG. 7b, right) contracts and stretches the cooled nitinol spring 20 (FIG. 7b, left). The cable sections 45, 46, 46' transfer the tensile force of the contracting right nitinol spring 20 to the left nitinol spring 20. Here the force required to stretch the nitinol spring 20 is less than the tensile force of the cable 45. Valve 23 (left side of FIG. 7b) is closed, the right valve 23 is open. The medium in cylinder space 16 is pressed into the outside area through the apertures 38.

Installed in the line 19 are two valves 21, 21'. The one valve 21 opens in the upper end position of cylinder piston 15, where the valve controller 26 allows access from line 19 to cylinder 10. The other valve 21' controls and coordinates the alternating strokes between the two drive assemblies 48, 48' in this upper end position. The valve 21' is temperature controlled and only opens when the nitinol spring 20 in the store 12 of the other interacting drive assembly has fallen below a certain, adjustable temperature T. This prevents the contracted nitinol spring in the medium M2 from being stretched again before it has reached a certain cooling temperature. Instead of two valves 21, 21' another valve can be used which combines both.

The temperature is controlled by direct measurement of the temperature at the nitinol spring 20 immersed in medium 2 using an electrical or electronic temperature sensor. Mechanical temperature sensors, such as bimetal control thermostats, can also be used. Depending on the selection of the temperature sensor, it is therefore possible to trigger the second valve 21' mechanically or electrically or electronically.

As an alternative to direct measurement on the nitinol spring 20 immersed in the medium M2, it is also possible to arrange a temperature controller directly on the valve, which reflects the cooling process of the nitinol spring in the medium M2, so that no connection to the nitinol spring 20 is necessary.

In the embodiments described above, the heated nitinol spring 20 contracts and draws itself into the cold medium M2. It is pre-supposed that the cooling time of the nitinol spring 20 in medium M2 takes longer than the time of contraction of the nitinol spring 20, due to its heat hysteresis, otherwise the nitinol spring section immersed first in medium M2 could be pulled apart again by the return spring before the complete immersion of the nitinol spring in medium M2 is completed. Furthermore, the cylinder piston 15 constantly passes over the aperture 58 located on the cylinder 10, which over time could result in damage to the cylinder head gaskets.

Figure 9:
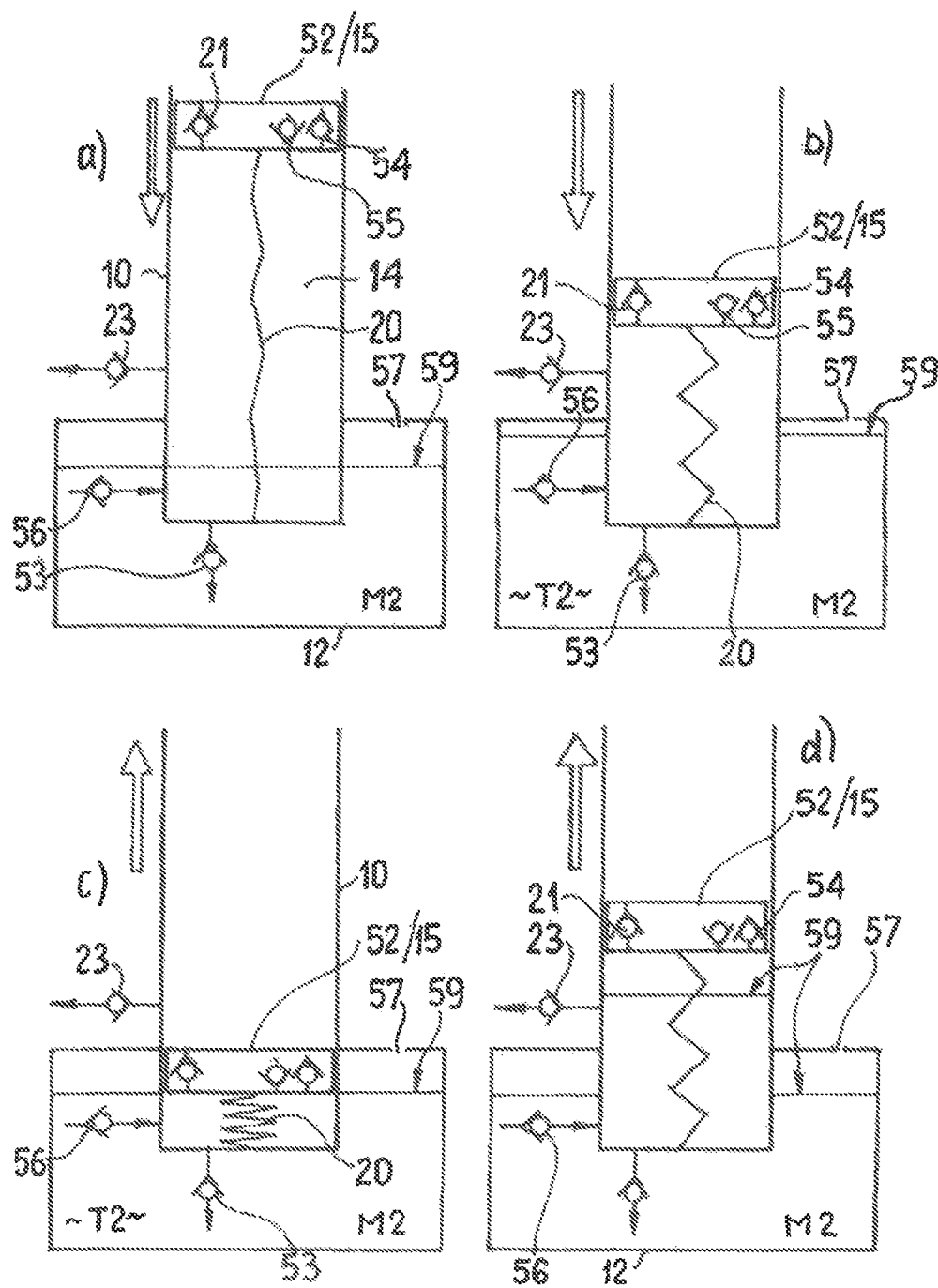
FIG. 9 is a schematic view of an alternative cycle of the drive system.

With the embodiment pursuant to FIG. 9 it is possible to avoid such disadvantages. The introduction of medium M1 in the upper end position (of cylinder piston 15) is carried out by the cylinder piston 15 itself, which comprises at least one valve 21; 54, 55.

The cylinder piston 15 is preferably hollow and forms a hollow body 52.

In phase (a) the nitinol spring 20 is extended. The medium M1 passes through valve 21 into the cylinder space 14 below the cylinder piston 15. At the same time, the valve 53 opens so that the medium M2 can flow out of the cylinder space 14. An aperture 57 on the upper wall of the store 12 provides pressure equalization.

In phase (b) the nitinol spring 20 is heated by the medium M1 and contracts. The medium M1 then escapes through the valve 23 into the store 11 and the medium M2 is pressed out of the lower cylinder space 14 by the compression of the medium M1 through the valve 53. The valve 53 closes to prevent any leakage of medium M1. A standard level measurement or flow limitation can be used here.

In phase (c) the nitinol spring 20 is fully contracted. Valve 56 opens and admits the colder medium M2 into the cylinder space 14. The valve 55 on the hollow body 52 opens and lets displaced medium M1 escape into the interior of this hollow body. The hollow cylinder piston 15 (hollow body 52) preferably has an intake capacity corresponding to the remaining volume of the cylinder space 14 when the nitinol spring is fully contracted.

In phase (d) the cold nitinol spring 20 is stretched by the restoring element 37 (or spring element 17). Here the valve 56 remains open and provides vacuum compensation. Then the valve 54 arranged on the hollow body 52 opens, which supports vacuum compensation. It is also possible to achieve vacuum compensation through valve 41 located on line 40. The remaining cylinder space 14 is flooded with medium M2. The level height of the colder medium M2 in all phases is designated with "59".

Overall, the embodiment pursuant to FIG. 9 allows for an improvement of process stability.

If the warmer medium M1 is to be gaseous, it is possible to minimize the volume of store 11. For example, the store 11 can be integrated into cylinder 10 while retaining upper apertures 38.

An adiabatic expansion is achieved so that the internal energy of the medium can be converted into useful mechanical work.

LIST OF DESIGNATIONS

10 cylinder
11 first store (medium 1)
12 second store (medium 2)
13 piston rod
14 cylinder space
15 cylinder piston
16 cylinder space
17 spring element
18 cylinder bottom
19 first pipe
20 metal element (nitinol spring)
21, 21' valve
22 second pipe
23 valve
24 sealing element 25 cylinder cover
26 valve controller
27 piston seal
28 housing
29 inner wall
30 line
31 supply line
32 outlet
33 section
34, 34' housing
35 actuating element
36 passage opening
37 restoring element
38 aperture
39 section
40 line
41 valve
42 valve
43 pressure relief valve
44 third store (medium 3)
45 cable
46, 46' cable section
47, 47' deflection roller
48, 48' drive assembly
49 drive assembly
50 outside area
51 middle section
52 hollow body
53 valve
54 valve
55 valve
56 valve
57 aperture
58 aperture (at 10)
59 level of medium M2
60 drive unit
61 locking pins
100 drive system
200 drive system
300 drive system
A fixing point (on the piston)
B fixing point (in store 12)
C connection point (piston rod 13 with cable section 46)
M1, M2, M3 medium
R1 direction
R2 direction
T1, T2, T3 temperature (of the medium)
W1, W2, W3 specific gravity
(a) cycle phase
(b) cycle phase
(c) cycle phase
(d) cycle phase

The invention claimed is:

1. A drive system based on the cyclic conversion of thermal energy into mechanical or electrical energy by using a difference in temperature between at least two media (M1, M2) and the contraction of a metal element (20) with shape memory properties, comprising:
at least one drive assembly (48, 48'; 49) which comprises a housing (34; 34') with at least one metal element (20) placed inside the housing (34; 34'),
at least one restoring element (37) located inside the housing (34; 34'), and
at least one moveable actuating element (35) to which the metal element (20) and the restoring element (37) are coupled, wherein a gaseous or liquid medium flows around the metal element (20) and the restoring element (37),
wherein
the drive assembly (48, 48'; 49) comprises at least one first and at least one second store (11; 12) containing media (M1, M2) at different temperatures, wherein the second store (12) has a passage opening (36) for direct connection of the second store (12) with a first cylinder space (14) through a bottom (18) of the housing (34, 34'),
the housing (34, 34') is a cylinder (10) which contains a liquid- and gas-tight arranged cylinder piston (15) and wherein the cylinder piston (15) forms the actuating element (35), and
the cylinder piston (15) divides the cylinder (10) into the first cylinder space (14) and a second cylinder space (16), wherein the two cylinder spaces (14, 16) are separated from each other by the cylinder piston (15), and wherein the first cylinder space (14), which is bounded by the bottom (18), contains the metal element (20) with shape memory properties, and the second cylinder space (16) contains the restoring element (37), wherein the metal element (20) is secured to the cylinder piston (15) at a fixing point (A) on the cylinder piston (15) and to a fixing point (B) located within the second store (12) so that a section (33) of the metal element (20) is in contact with the medium (M2) of the second store (12) and a section (39) is in contact with the medium (M1) in the second store (14).

2. The drive system as claimed in claim 1, wherein
the first store (11) is connected via a first pipe (19) to the second cylinder space (16) containing the restoring element (37), wherein at least one first valve (21, 21') is installed in the pipe (19), and
the first store (11) is connected via a second pipe (22) to the first cylinder space (14) containing the metal element (20), wherein at least one second valve (23) is installed in the pipe (22).

3. The drive system as claimed in claim 2, wherein the cylinder space (14) is connected via a further pipe (40) to a third store (44), wherein
the third store (44) is provided for receiving a gaseous or liquid medium (M3),
so that when the third medium (M3) has a temperature (T3) which is lower than the temperature (T1) of the medium (M1) and higher than the temperature (T2) of the medium (M2), the part of the metal element (20) located in the cylinder chamber (14) is preheated when the cylinder piston (15) moves in the direction (R2) and the stroke frequency and thus the power of the drive system is increased as a result.

4. The drive system as claimed in claim 2, further comprising a valve controller (26) which controls the first valve (21, 21') by a stroke of a piston rod (13) connected directly or indirectly to the cylinder piston (15).

5. The drive system as claimed in claim 2, wherein the restoring element (37) is a spring (17).

6. The drive system as claimed in claim 1, wherein the cylinder piston (15) is a hollow body (52) which includes at least one valve (21'; 60, 61).

7. The drive system as claimed in claim 2, wherein the first store (11) is arranged within the second cylinder space (16).

8. The drive system as claimed in claim 2, wherein the restoring element (37) is formed by the piston rod (13) and a cable connection (46, 46') coaxially connected to the piston rod (13), wherein the cable section (46, 46') is moveable in translation up to a deflection roller (47, 47').

9. The drive system as claimed in claim 1, wherein the medium of the stores is liquid or gaseous.

10. The drive system as claimed in claim 9, wherein the media of the stores are immiscible with each other and/or have different specific weights.

11. The drive system as claimed in claim 1, wherein at least one store is thermally insulated.

12. The drive system as claimed in claim 1, wherein a plurality of the drive systems are coupled to one another and the movement of the cylinder pistons (15) is coordinated by a control device.

13. The drive system as claimed in claim 1, wherein an upper and/or a lower final position control of the cylinder pistons (15) is provided as the control device.

14. A method for generating energy by converting heat into mechanical or electrical energy in a closed drive system, comprising:
providing housing (34, 34') in the form of a cylinder (10);
providing a cylinder piston (15) in the cylinder, wherein the cylinder piston (15) divides the cylinder (10) into a first cylinder space (14) and a second cylinder space (16), wherein the two cylinder spaces (14, 16) are separated from each other by the cylinder piston (15);
placing a metal element (20) in the cylinder (10), wherein the metal element (20) is attached to the cylinder piston (15) and extends through the first cylinder space (14), and wherein the metal element (20) has shape memory properties;
providing a restoring element (37) in the cylinder (10), wherein the restoring element (37) is attached to the cylinder piston (15) and extends through the second cylinder space (16); and
subjecting the metal element (20) to uniaxial contraction by applying a temperature difference (T1) and (T2), between two respective media (M1) and (M2), to the metal element (20),
wherein the temperature difference (T1) and (T2) between the two respective media (M1) and (M2) is maintained by a cyclical pumping process, which is realized by a reciprocating action of the cylinder piston (15) to which the metal element (20) is attached, whereby the temperature difference (T1) and (T2) causes the metal element (20) to contract and to move the cylinder piston (15) in a first direction (R1) and the restoring element (37) subsequently causes the cylinder piston (15) to move in a second direction (R2) opposite the first direction (R1) thereby creating the reciprocating action of the cylinder piston (15), and
wherein the pumping process is controlled by actuating a valve controller (26) by the stroke of a piston rod (13) provided on the cylinder piston (15).

15. The method as claimed in claim 14, wherein the heat involved is waste heat.

16. The method as claimed in claim 15, wherein the waste heat is generated by a combustion engine or an exothermic chemical plant.

17. The drive system as claimed in claim 5, wherein the spring (17) is a tensioning spring.

18. The drive system as claimed in claim 13, wherein the control device comprises a spring-supported locking bolt (61) for fixing the upper and/or the lower final position control of the cylinder pistons (15).

* * * * *